(12) United States Patent
Contractor

(10) Patent No.: US 7,099,677 B2
(45) Date of Patent: Aug. 29, 2006

(54) SMART CALL DELIVERY GIS INTEGRATION

(75) Inventor: Sunil H. Contractor, Marietta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 408 days.

(21) Appl. No.: 09/997,098

(22) Filed: Nov. 29, 2001

(65) Prior Publication Data

US 2003/0100319 A1 May 29, 2003

(51) Int. Cl.
*H04Q 7/20* (2006.01)

(52) U.S. Cl. .................. 455/461; 455/417; 455/414.1; 379/211.02; 379/212.01

(58) Field of Classification Search .............. 455/414, 455/417, 418, 422, 432, 435, 436, 445, 456, 455/457, 461, 464, 414.1–414.4, 432.1–432.3, 455/435.1–435.3; 379/201.01, 211.01, 211.02, 379/212.01

See application file for complete search history.

(56) References Cited

U.S. PATENT DOCUMENTS

| | | | |
|---|---|---|---|
| 5,436,957 A | | 7/1995 | McConnell |
| 5,438,568 A | | 8/1995 | Weisser, Jr. |
| 5,452,350 A | | 9/1995 | Reynolds et al. |
| 5,583,564 A | | 12/1996 | Rao et al. |
| 5,590,188 A | | 12/1996 | Crockett |
| 5,727,057 A | * | 3/1998 | Emery et al. ............... 455/456 |
| 5,740,237 A | | 4/1998 | Malik et al. |
| 5,933,490 A | | 8/1999 | White et al. |
| 5,978,673 A | | 11/1999 | Alperovich et al. |
| 6,038,451 A | * | 3/2000 | Syed et al. ................. 455/445 |
| 6,128,481 A | * | 10/2000 | Houde et al. ............... 455/404 |
| 6,151,385 A | | 11/2000 | Reich et al. |
| 6,201,856 B1 | | 3/2001 | Orwick et al. |
| 6,208,854 B1 | * | 3/2001 | Roberts et al. ............. 455/417 |
| 6,295,346 B1 | | 9/2001 | Markowitz et al. |
| 6,301,349 B1 | | 10/2001 | Malik |
| 6,404,885 B1 | | 6/2002 | Field et al. |
| 6,427,001 B1 | | 7/2002 | Contractor et al. |
| 6,442,241 B1 | | 8/2002 | Tsumpes |
| 6,608,886 B1 | | 8/2003 | Contractor |
| 6,614,896 B1 | | 9/2003 | Rao |
| 6,622,016 B1 | | 9/2003 | Sladek et al. |
| 6,631,258 B1 | | 10/2003 | Chow et al. |
| 6,671,350 B1 | | 12/2003 | Oxley |
| 6,738,456 B1 | | 5/2004 | Wrona et al. |

OTHER PUBLICATIONS

U.S. Appl. No. 09/997,348, filed Nov. 29, 2001.
U.S. Appl. No. 09/995,142, filed Nov. 27, 2001.
U.S. Appl. No. 10/457,684, filed Jun. 9, 2003.
International Application No. PCT/US02/36763 filed Nov. 14, 2002.
U.S. Appl. No. 09/997,096, filed Nov. 29, 2001.
Newton, H., Newton's Telecom Dictionary, 2000, p. 414.

* cited by examiner

*Primary Examiner*—Nay Maung
*Assistant Examiner*—Tammy Lele
(74) *Attorney, Agent, or Firm*—Withers & Keys, LLC

(57) ABSTRACT

A method of delivering a call to a called party's device. The method includes receiving a call directed to a wireline device and validating that a telephone number of the wireline device is associated with a telephone number of a wireless device. The method also includes transmitting a message to the wireless device, delivering the call to the wireline device when a return message is not received from the wireless device, and determining a location of the wireless device when a return message is received from the wireless device. The method further includes comparing the location of the wireless device with a location of the wireline device, delivering the call to the wireless device when the location of the wireless device is not within a predefined vicinity of the location of the wireline device, and delivering the call to the wireline device when the location of the wireless device is within a predefined vicinity of the location of the wireline device.

8 Claims, 3 Drawing Sheets

SMART CALL DELIVERY GIS INTEGRATION

TECHNICAL FIELD

The present invention is directed generally to the field of telecommunications and, more particularly, to wireless telecommunications.

BACKGROUND

Smart Call Delivery (SCD) is a service offered by some telecommunications service providers. Using conventional SCD, subscribers are able to re-direct calls made to their wireline phone to an associated wireless device. If the wireless device is on, the call is directed to the wireless phone. Although SCD is particularly useful to those who travel frequently, subscribers oftentimes forget to turn off their wireless device when returning to the home or office where SCD is not needed. Consequently, calls are re-directed to the wireless device when it may have been more economical from the point of view of the subscriber to receive the call via a wireline phone. Because wireless airtime charges may be greater than those for standard wireline services, a subscriber can incur additional expense if SCD is not limited to use only when the subscriber is away from the proximity of the subscriber's wireline phone.

A second though unrelated problem facing wireless subscribers is the inability of emergency care personnel to pinpoint a caller's location. Using geographic information system (GIS) applications, calls from a wireline phone can be associated with an address and represented on a computer-generated map. Calls from wireless devices, on the other hand, cannot be associated with a fixed address. This raises concerns about public safety, because emergency services such as 911 frequently rely on GIS information when responding to calls. As a result, the United States Federal Communications Commission (FCC) has introduced the Emergency 911 (E-911) mandate, requiring that wireless phone providers incorporate automatic location identification (ALI) features into their products by October of 2001. Using ALI technologies such as global positioning systems (GPS) and cellular triangulation, E-911 callers can be pinpointed well within the requirement of the FCC mandate.

Although the number of wireless products and services incorporating ALI features has been rapidly increasing in response to E-911 requirements, no system or method exists for utilizing these technologies to determine when wireless services such as SCD should be enabled or disabled.

Thus, a need exists for a system that integrates the locational capabilities of wireless devices with GIS technology to improve the functionality and minimize the costs associated with existing services. In particular, combining these technologies would allow subscribers to conserve wireless airtime when more economical wireline alternatives may be available.

SUMMARY

According to one embodiment, the present invention is directed to a method of delivering a call to a called party's device. The method includes receiving a call directed to a wireline device and validating that a telephone number of the wireline device is associated with a telephone number of a wireless device. The method also includes transmitting a message to the wireless device, delivering the call to the wireline device when a return message is not received from the wireless device, and determining a location of the wireless device when a return message is received from the wireless device. The method further includes comparing the location of the wireless device with a location of the wireline device, delivering the call to the wireless device when the location of the wireless device is not within a predefined vicinity of the location of the wireline device, and delivering the call to the wireline device when the location of the wireless device is within a predefined vicinity of the location of the wireline device.

BRIEF DESCRIPTION OF THE FIGURES

The present disclosure will be described in conjunction with the following figures, wherein.

DETAILED DESCRIPTION

The term "calling party" is used herein generally to refer to the person or unit that initiates a telecommunication. The calling party may also be referred to herein as "caller." In some cases, the calling party may not be a person, but may be a device such as a facsimile machine, an answering service, a modem, etc. The term "called party" or "customer" is used herein generally to refer to the person or unit that answers or responds to the call or communication. The term "communication" is used herein to include all messages or calls that may be exchanged between a calling party and a called party, including voice, data and video messages. The term "communication" is used synonymously herein with the term "call" unless a distinction is noted.

One embodiment of the present invention is directed to a system and method of re-directing wireline telephone calls to an associated wireless device only when the wireless device is in a different location than the wireline telephone. Accordingly, the SCD service with GIS integration described by the present invention prevents call re-direction when the call can be answered using the wireline telephone.

According to one embodiment, the present invention utilizes the intelligent functionality of an Advanced Intelligent Network (AIN). The AIN is a network used in conjunction with a conventional telephone network, such as the public switched telephone network (PSTN), to provide enhanced voice and data services and dynamic routing capabilities using two different networks. The actual voice call is transmitted over a circuit-switched network, but the signaling is done on a separate packet-switched network. Before describing further details of the present invention, a description of the AIN is provided.

Figure 1:
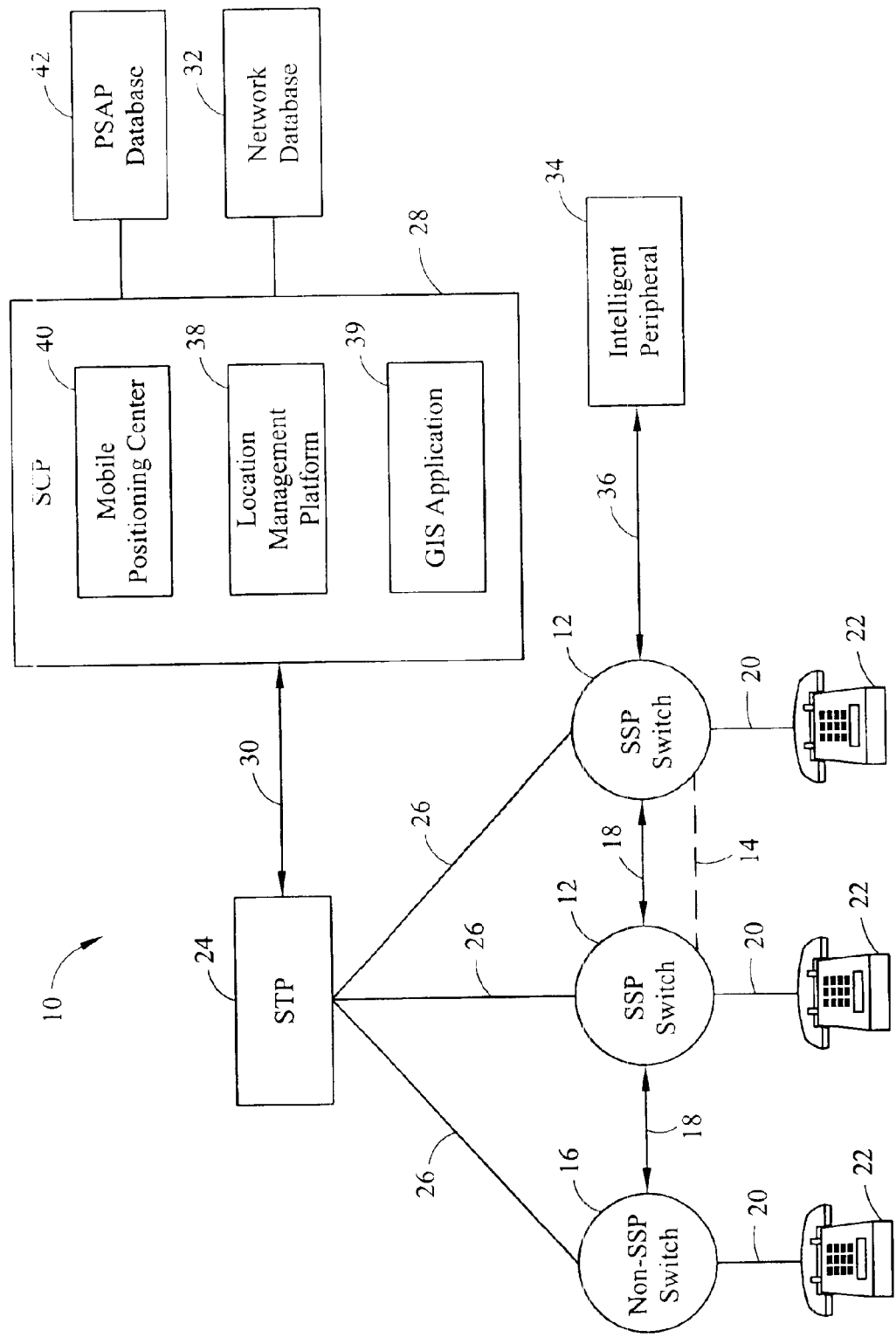
FIG. 1 illustrates an embodiment of an Advanced Intelligent Network.

FIG. 1 is a block diagram of an Advanced Intelligent Network (AIN) 10 for integration with the public switched telephone network (PSTN). The AIN 10 may be employed by a Local Exchange Carrier (LEC), and may be utilized by the LEC to allow the LEC to provide call processing features and services that are not embedded within conventional switching circuits of the PSTN.

A typical LEC includes a number of central office (CO) switches for interconnecting customer premises terminating equipment with the PSTN. For an LEC including the AIN 10 as illustrated in FIG. 1, the central office switches may be provided as Service Switching Points (SSP) switches 12. The dashed line 14 between the SSP switches 12 indicates that the number of SSP switches 12 in the AIN 10 may vary depending on the particular requirements of the AIN 10. The AIN 10 may also include a non-SSP switch 16. The difference between the SSP switches 12 and the non-SSP switch 16 is that the SSP switches 12 provide intelligent network functionality. Interconnecting the SSP switches 12 and the non-SSP switch 16 are communication links 18 which may be, for example, trunk circuits.

Each SSP switch 12 and non-SSP switch 16 has a number of subscriber lines 20 connected thereto. The subscriber lines 20 may be, for example, conventional twisted pair loop circuits connected between the switches 12, 16 and the telephone drops for the customer premises, or the subscriber lines 20 may be trunk circuits, such as T-1 trunk circuits. Typically, the number of subscriber lines 20 connected to each switch 12, 16 is on the order of ten thousand to one hundred thousand lines. Each of the subscriber lines 20 is connected to a terminating piece of customer premises equipment, represented in FIG. 1 by the landline telephones 22. Alternatively, the terminating equipment may be another type of telecommunications unit such as, for example, a telecopier, a personal computer, a modem, or a private branch exchange (PBX) switching system. allow the LEC to provide call processing features and services that are not embedded within conventional switching circuits of the PSTN.

A typical LEC includes a number of central office (CO) switches for interconnecting customer premises terminating equipment with the PSTN. For an LEC including the AIN 10 as illustrated in FIG. 1, the central office switches may be provided as Service Switching Points (SSP) switches 12. The dashed line 14 between the SSP switches 12 indicates that the number of SSP switches 12 in the AIN 10 may vary depending on the particular requirements of the AIN 10. The AIN 10 may also include a non-SSP switch 16. The difference between the SSP switches 12 and the non-SSP switch 16 is that the SSP switches 12 provide intelligent network functionality. Interconnecting the SSP switches 12 and the non-SSP switch 16 are communication links 18 which may be, for example, trunk circuits.

Each SSP switch 12 and non-SSP switch 16 has a number of subscriber lines 20 connected thereto. The subscriber lines 20 may be, for example, conventional twisted pair loop circuits connected between the switches 12, 16 and the telephone drops for the customer premises, or the subscriber lines 20 may be trunk circuits, such as T-1 trunk circuits. Typically, the number of subscriber lines 20 connected to each switch 12, 16 is on the order of ten thousand to one hundred thousand lines. Each of the subscriber lines 20 is connected to a terminating piece of customer premises equipment, represented in FIG. 1 by the landline telephones 22. Alternatively, the terminating equipment may be another type of telecommunications unit such as, for example, a telecopier, a personal computer, a modem, or a private branch exchange (PBX) switching system.

For the AIN 10 illustrated in FIG. 1, each SSP switch 12 and the non-SSP switch 16 are connected to a signal transfer point (STP) 24 via a communication link 26. The communication link 26 may employ, for example, the SS7 switching protocol. The STP 24 may be a multi-port high-speed packet switch that is programmed to respond to the routing information in the appropriate layer of the switching protocol, and route the data packets to their intended destination.

One of the intended destinations of the data packets from the STP 24 is a service control point (SCP) 28. The STP 24 is in communication with the SCP 28 via a communication link 30, which may also employ the SS7 switching protocol. The SCP 28 may be an intelligent database server such as, for example, an Intelligent Network Service Control Point available from Lucent Technologies Inc., Murray Hill, N.J., and may have associated with it a network database 32 for storing network data. The intelligent functionality of the SCP 28 may be realized by application programs, such as programmable Service Program Applications (SPA), which are run by the SCP 28. The SCP 28 is normally employed to implement high volume routing services, such as call forwarding and number portability translation and routing. In addition, another of the functions of the SCP 28 is hosting of the network database 32, which may store subscriber information, such as subscriber call management profiles, used in providing enhanced calling services, such as the SCD service with GIS integration described by the present invention.

In order to implement the system described by the present invention, a mobile positioning center (MPC) 40 may reside on the SCP 28. The MPC 40 is an SS7-based location management component that can interface with a variety of PDE's utilizing ALI technologies such as GPS, A-GPS, AOA, TOA, and TDOA. Locational data can be transferred from the MPC 40 to the SCP 28 for further processing. An example of such processing is E-911 call routing, which may include receiving locational data from the MPC 40, comparing that information to a PSAP database 42 accessible to the SCP 28, and routing the call to an appropriately-located emergency service. Data processing may be performed using a location management platform (LMP) 38 such as MapInfo® LMP, an application programming interface available from MapInfo Corporation, Troy, N.Y. Residing on the SCP 28, the LMP 38 converts locational data into a format compatible with other SCP 28 applications, such as the GIS application 39 of the present invention, as described hereinbelow in conjunction with FIGS. 2 and 3. Alternatively, locational data may be transferred to non-SCP 28 applications for processing from the LMP 38, or directly from the MPC 40.

The AIN 10 illustrated in FIG. 1 also includes an intelligent peripheral device (IP) 34. The IP 34 may be a services node such as, for example, a Compact Services Node (CSN) available from Lucent Technologies Inc., Murray Hill, N.J., although the IP 34 may be any other type of available AIN-compliant intelligent peripheral device. The IP 34 may be connected to one or more of the SSP switches 12 via a communications link 36 which may be, for example, an Integrated Service Digital Network (ISDN), including BRI (Basic Rate Interface) or PRI (Primary Rate Interface) lines. According to other embodiments, the communications link 36 may be, for example, a T-1 trunk circuit.

The IP 34 may be used primarily when some enhanced feature or service is needed that requires an audio connection to the call such as, for example, call return and calling name services. Similar to the SCP 28, the intelligent functionality of the IP 34 may be realized by programmable applications executable by the IP 34.

In order to keep the processing of data and calls as simple as possible at the switches, such as at the SSP switches 12, a set of triggers may be defined at the SSP switches 12 for each call. A trigger in an AIN is an event associated with a particular subscriber line 20 that generates a data packet to be sent from the SSP switch 12 servicing the particular subscriber line 20 to the SCP 28 via the STP 24. The triggers may be originating triggers for calls originating from the subscriber premises or terminating triggers for calls terminating at the subscriber premises. A trigger causes a message in the form of a query to be sent from the SSP switch 12 to the SCP 28.

The SCP 28 in turn interrogates the network database 32 to determine whether some customized call feature or enhanced service should be implemented for the particular call, or whether conventional dial-up telephone service should be provided. The results of the database inquiry are sent back from the SCP 28 to the SSP switch 12 via the STP 24. The return packet includes instructions to the SSP switch 12 as to how to process the call. The instructions may be to take some special action as a result of a customized calling service or enhanced feature. For example, for an enhanced calling feature requiring the capabilities of the IP 34, the return message from the SCP 28 may include instructions for the SSP switch 12 to route the call to the IP 34. In addition, the return message from the SCP 28 may simply be an indication that there is no entry in the network database 32 that indicates anything other than conventional telephone service should be provided for the call. The query and return messages may be formatted, for example, according to conventional SS7 TCAP (Transaction Capabilities Application Part) formats. U.S. Pat. No. 5,438,568, which is incorporated herein by reference, discloses additional details regarding the functioning of an AIN.

The AIN 10 illustrated in FIG. 1 includes only one STP 24, one SCP 28, one network database 32, and one IP 34, although the AIN 10 may further include an additional number of these components as well as other network components, which are not included in FIG. 1 for purposes of clarity. For example, the AIN 10 may additionally include redundant SCPs and STPs to take over if the STP 24 or the SCP 28 should fail. In addition, the AIN 10 may include an Automatic Electronic Switching System (AESS) Network Access Point (NAP) in communication with the STP 24, which may be programmed to detect the trigger conditions. Further, the AIN 10 may include regional STPs and regional SCPs in communication with, for example, the local STP 24, for routing and servicing calls between different LECs.

Figure 2:
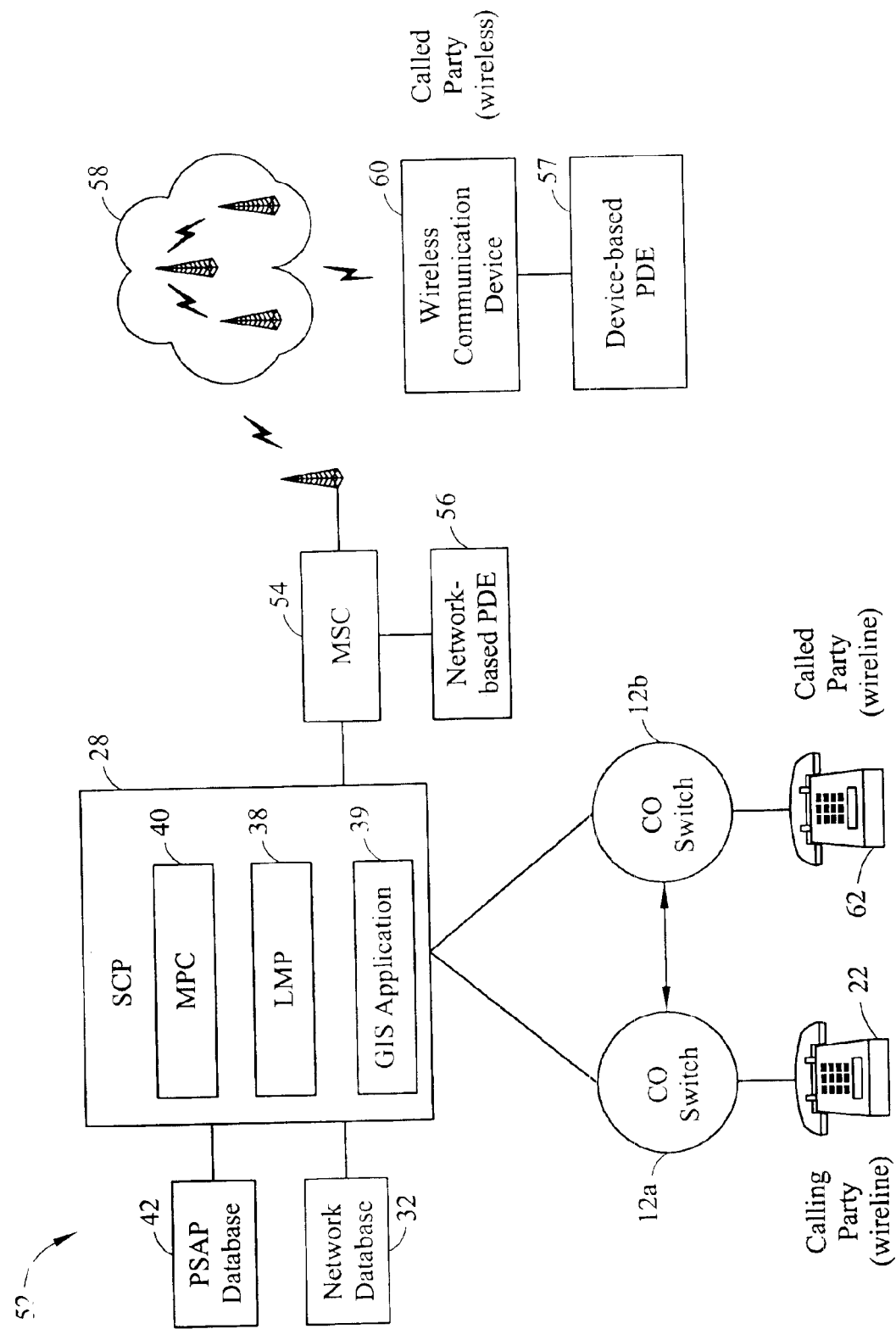
FIG. 2 illustrates an embodiment of the call delivery system utilizing GIS integration of the present invention.

FIG. 2 is a diagram illustrating a system 52 according to an embodiment of the present invention. The system 52 incorporates portions of the AIN 10 described above, including SSP switches 12*a*–*b* (designated as "CO SWITCH" in FIG. 2) and the SCP 28. The system 52 also includes a second switch 54 in communication with the SCP 28 of the AIN 10 described in FIG. 1. The second switch 54 may be, for example, a mobile switching center (MSC) 54, such as the Alcatel 1000 S12 switch manufactured by Alcatel. The MSC 54 further communicates with a wireless network 58 and thus serves as a connection point to fixed networks such as PSTN's. The wireless network 58 may encompass numerous other systems 52, thereby providing wireless service over a large area. An example of the wireless network 58 is a cellular telephone network. The wireless network 58 may communicate with a variety of wireless communication devices 60, examples of which can include wireless telephones, wireless PDA's, WAP devices, and interactive pagers.

The system 52 may also include position-determining equipment (PDE) 56, 57 for providing the location of the wireless communication device. The PDE can be device-based, network-based, or a combination of both. An example of a device-based PDE 57 is a GPS receiver. Network-based PDE's 56 can include circuits performing Time-of-Arrival (TOA) positioning, Angle-of-Arrival (AOA) positioning, or Time Difference of Arrival (TDOA) positioning. An example of both a device-based and network-based PDE 56, 57 is an Assisted GPS (A-GPS) system in which a device-based GPS receiver 57 is assisted by a network-based GPS receiver 56 to minimize the acquisition time of the device-based GPS receiver 57.

The accuracy with which a caller's position is determined depends on the locational technology employed. Using GPS technology, measurements accurate to within several meters are typical in open environments. GPS consists of a constellation of 24 earth-orbiting satellites, four of which are visible to an earth-based GPS receiver at any given time. The receiver analyzes radio broadcasts from each of the satellites, and using trilateration algorithms, computes the longitude, latitude, and altitude of the receiver's location. A-GPS relies on an earth-based GPS reference network providing assistance to the GPS receiver, reducing acquisition time from minutes to seconds, in addition to improving accuracy.

Although GPS-based PDE's provide the best accuracy, most of the wireless devices in use today are not GPS-capable. Radio-based locational technologies, on the other hand, do not require device-based PDE's 57, relying instead on network-based measurements of electromagnetic signals emitted by the wireless communication device during normal operation. AOA systems, for example, use triangulation to determine the location of a signal source and require a minimum of two receiving stations. These systems, however, require installation of directional antennas. TOA and TDOA systems identify position by measuring either time of arrival or time difference of arrival of electromagnetic signals. Radio-based technologies may be combined into hybrid PDE's, such as the Sigma-5000 TDOA/AOA Location System™ designed by SigmaOne Communications Corporation, Woodland Hills, Calif. Typical accuracies of radio-based PDE's are on the order of several hundred feet.

Figure 3:
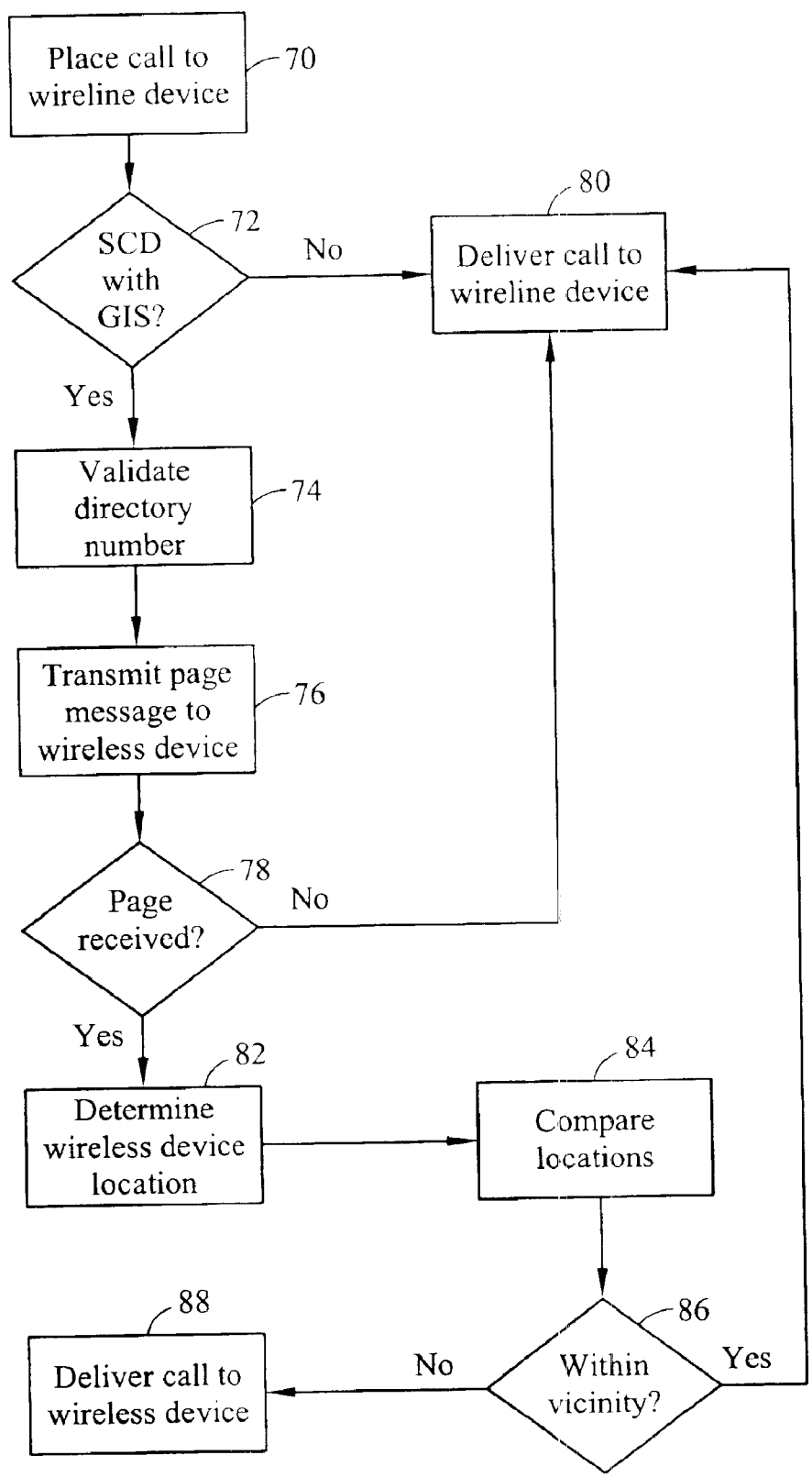
FIG. 3 illustrates an embodiment of a flow through the system of FIG. 2.

For purposes of describing features of the present invention, the calling party is a user of a telephone 22. The called party is a user of a wireline telephone 62 and an associated wireless communication device 60. One embodiment of the present invention is directed to a system and a method for delivering a wireline telephone call to an associated wireless device only when the wireless device is in a different location than the wireline telephone as illustrated in FIG. 3. According to this embodiment, the calling party places a call to the wireline telephone 62 of the called party at step 70, who may be a subscriber to the SCD service with GIS integration described by the present invention or may use the service on a pay-per-usage basis. The SCP 28, as described above, may execute a SPA program to determine what customized call features or enhanced services should be implemented for a particular call. Accordingly, the SCP 28 interrogates its network database 32 to determine if the SCD service with GIS integration described by the present invention is available to the called party at step 72. If the SCD service with GIS integration is not available, the call is delivered to the wireline device 62 at step 80.

After the SCP 28 verifies that the called party is a subscriber to the SCD service with GIS integration, the AIN 10 may route the call to the MSC 54. The MSC 54 validates the directory number of the wireless communication device 60 associated with the called party's wireline telephone 62 at step 74 and then transmits a page message over the wireless network 58 at step 76. If on, the wireless communication device 60 may return a page response to the MSC 54 via the wireless network 58 at step 78. The page response from the wireless communication device 60 can include an electronic serial number (ESN) and a mobile identification number (MIN) associated with the wireless communication device 60 for call processing purposes. If no page response is received, it is assumed that the wireless communication device 60 is not on. In this case, the system described by the present invention will deliver the call directly to the called party's wireline telephone 62 at step 80.

In one embodiment, the page response from the wireless communication device 60 may further include locational information obtained from a device-based PDE 57, such as a GPS or A-GPS. This information may include, for example, the longitude, latitude, and altitude of the wireless communication device 60.

In another embodiment, the page response transmitted by the wireless communication device 60 may contain no locational information. In this embodiment, detection of the page response at the MSC 54 and subsequent processing using network-based PDE's can reveal the called party's location.

Following a determination of the called party's wireless device's 60 position at step 82, the results may be transferred from the PDE 56, 57 to the MPC 40 via the MSC 54. The MPC 40 may be a server retrieving and logging locational information from various PDE's for use by other applications. An example of an MPC 40 is the Ericsson Mobile Positioning System (MPS), made by Ericsson. A GIS application providing locational services such as the SCD service with GIS integration described by the present invention may then access the locational information contained in the MPC 40 via the LMP 38. The LMP 38 converts the locational data into formats compatible with other applications. These applications may reside on the SCP 28 or a non-SS7-based network, such as an IP network, for example.

Next, the GIS application 39 may compare the location of the called party's wireline telephone 62 to the location of the associated wireless communication device 60 at step 84. In one embodiment, the SCP 28 and the GIS application 39 executing therein acquires the wireline location by querying a database containing directory numbers and associated addresses, such as a PSAP database 42. If the locations are determined to be identical or within a certain vicinity at step 86, such a vicinity can be set to a default or may be user selectable or if the wireless communication device 60 does not return a page response, the GIS application 39 will instruct the AIN 10 to route the call directly to the called party's wireline telephone 62 at step 80. Otherwise, the call will be delivered to the associated wireless communication device 60 at step 88.

It is to be understood that the present description illustrates those aspects of the invention relevant to a clear understanding of the invention. Certain aspects of the invention that would be apparent to those of ordinary skill in the art and that, therefore, would not facilitate a better understanding of the invention, have not been presented in order to simplify the present description. Although the present invention has been described in connection with certain embodiments, those of ordinary skill in the art will, upon considering the foregoing description, recognize that many modifications and variations of the invention may be employed. It is intended that all such variations and modifications of the invention be covered by the foregoing description and following claims.

What is claimed is:

1. A method of delivering a call to a called party's device, comprising:
   receiving a call directed to a wireline device;
   validating that a telephone number of the wireline device is associated with a telephone number of a wireless device;
   transmitting a message to the wireless device;
   delivering the call to the wireline device when a return message is not received from the wireless device;
   determining a location of the wireless device when a return message is received from the wireless device;
   comparing the location of the wireless device with a location of the wireline device;
   delivering the call to the wireless device when the location of the wireless device is not within a predefined vicinity of the location of the wireline device; and
   delivering the call to the wireline device when the location of the wireless device is within a predefined vicinity of the location of the wireline device.

2. The method of claim 1, further comprising determining whether the called party is a subscriber to a call delivery service with GIS integration.

3. The method of claim 1, further comprising routing the call to a telecommunications switch.

4. The method of claim 1, further comprising receiving a return message from the wireless device containing at least one of an electronic serial number and a mobile identification number.

5. The method of claim 1, further comprising receiving a return message from the wireless device containing locational information associated with the wireless device.

6. The method of claim 1, further comprising accessing a database to obtain the location of the wireline device.

7. An apparatus for delivering a call to a called party's device, comprising:
   means for receiving a call directed to a wireline device;
   means for validating that a telephone number of the wireline device is associated with a telephone number of a wireless device;
   means for transmitting a message to the wireless device;
   means for delivering the call to the wireline device when a return message is not received from the wireless device;
   means for determining a location of the wireless device when a return message is received from the wireless device;
   means for comparing the location of the wireless device with a location of the wireline device;
   means for delivering the call to the wireless device when the location of the wireless device is not within a predefined vicinity of the location of the wireline device; and
   means for delivering the call to the wireline device when the location of the wireless device is within a predefined vicinity of the location of the wireline device.

8. A computer-readable medium having stored thereon instructions which, when executed by a processor, causes the processor to:
   receive a call directed to a wireline device;
   validate that a telephone number of the wireline device is associated with a telephone number of a wireless device;
   transmit a message to the wireless device;
   deliver the call to the wireline device when a return message is not received from the wireless device;
   determine a location of the wireless device when a return message is received from the wireless device;
   compare the location of the wireless device with a location of the wireline device;
   deliver the call to the wireless device when the location of the wireless device is not within a predefined vicinity of the location of the wireline device; and
   deliver the call to the wireline device when the location of the wireless device is within a predefined vicinity of the location of the wireline device.

* * * * *